United States Patent
Waffenschmidt et al.

(10) Patent No.: US 11,073,859 B2
(45) Date of Patent: Jul. 27, 2021

(54) ELECTRICAL DEVICE AND POWER GRID SYSTEM FOR PROVIDING A DEVICE OUTPUT DEPENDING ON AN ELECTRICAL INPUT

(75) Inventors: Eberhard Waffenschmidt, Aachen (DE); Matthias Wendt, Würselen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 56 days.

(21) Appl. No.: 14/241,544

(22) PCT Filed: Sep. 12, 2012

(86) PCT No.: PCT/IB2012/054727
§ 371 (c)(1),
(2), (4) Date: Apr. 29, 2014

(87) PCT Pub. No.: WO2013/038339
PCT Pub. Date: Mar. 21, 2013

(65) Prior Publication Data
US 2014/0225587 A1    Aug. 14, 2014

Related U.S. Application Data

(60) Provisional application No. 61/533,287, filed on Sep. 12, 2011.

(30) Foreign Application Priority Data

Sep. 12, 2011   (EP) .................................... 11186064

(51) Int. Cl.
*G05F 5/00*      (2006.01)
*H05B 33/08*     (2020.01)
(Continued)

(52) U.S. Cl.
CPC ............... *G05F 5/00* (2013.01); *H05B 33/08* (2013.01); *H05B 47/185* (2020.01); *H02M 2001/0003* (2013.01)

(58) Field of Classification Search
CPC ....... G05F 5/00; H05B 33/08; H05B 37/0263; H02M 2001/0003; H02M 2001/003; H02M 1/36; H03M 1/36
(Continued)

(56) References Cited

U.S. PATENT DOCUMENTS 5,747,942 A * 5/1998 Ranganath ......... H05B 41/3925
                                                   315/209 R
5,828,329 A * 10/1998 Burns .................... G05F 3/225
                                                       323/315

(Continued)

FOREIGN PATENT DOCUMENTS

DE   202005001221 U1   12/2005
DE   202010005323 U1    7/2010
WO     2011073829 A1    6/2011

OTHER PUBLICATIONS

Blaog, Robert S., "Autonomous Local Control in Distributed DC Power Systems", Department of Electrical Computer Engineering, Univ. of Illinois at Urbana-Champaign, 2006, pp. 1-202.
(Continued)

*Primary Examiner* — Thienvu V Tran
*Assistant Examiner* — Lorena D Bruner (57) ABSTRACT

The invention relates an electrical device for providing an output depending on an electrical input. The electrical device (1) is adapted to provide a constant output, if the electrical input is in a first electrical input range, and a dependent output, if the electrical input is in a second electrical input range, wherein the dependent output depends on the electrical input. The output can therefore remain constant, even if the electrical input, which is preferentially (Continued)

a DC grid voltage, fluctuates within the first electrical input range. Moreover, in the second electrical input range the output can be controlled by just controlling the electrical input like the DC grid voltage, without necessarily requiring an additional control construction of the electrical device. A resistance against fluctuations of the electrical input and a controllability of the output can therefore be realized in a relatively simple way.

15 Claims, 9 Drawing Sheets (51) Int. Cl.
*H05B 47/185* (2020.01)
*H02M 1/00* (2006.01)
(58) Field of Classification Search
USPC .................................. 323/283, 299
See application file for complete search history.

(56) References Cited

U.S. PATENT DOCUMENTS

| | | | | |
|---|---|---|---|---|
| 5,970,074 A * | 10/1999 | Ehiro | ................... | G01R 31/30 714/745 |
| 6,388,488 B1 * | 5/2002 | Ho | ................... | H03K 3/356008 327/112 |
| 6,465,903 B1 * | 10/2002 | Wuidart | .............. | H02J 13/0048 307/3 |
| 6,700,333 B1 * | 3/2004 | Hirshi | ................ | H02M 5/2573 307/115 |
| 6,950,950 B2 * | 9/2005 | Sawyers | ................... | G06F 1/30 363/48 |
| 2002/0033680 A1 * | 3/2002 | Fehd | ................ | H05B 33/08 315/312 |
| 2002/0061738 A1 * | 5/2002 | Simmons | ................ | H03G 7/06 455/234.1 |
| 2004/0062063 A1 * | 4/2004 | Siri | ............................ | 363/84 |
| 2004/0169498 A1 * | 9/2004 | Goder | .................... | H02M 1/36 323/222 |
| 2006/0125426 A1 * | 6/2006 | Veskovic | ........... | H05B 37/0254 315/312 |
| 2006/0192536 A1 * | 8/2006 | Chen | .................... | H02M 3/157 323/222 |
| 2009/0160368 A1 | 6/2009 | Godbole | | |
| 2009/0261748 A1 | 10/2009 | Mckinney et al. | | |
| 2010/0072917 A1 * | 3/2010 | O'Gorman | ......... | H05B 37/0254 315/291 |
| 2010/0084991 A1 | 4/2010 | Liu et al. | | |
| 2010/0141158 A1 * | 6/2010 | Newman, Jr. | ...... | H05B 33/0845 315/182 |
| 2010/0219764 A1 * | 9/2010 | Yamasaki | .......... | H05B 33/0818 315/224 |
| 2011/0115399 A1 * | 5/2011 | Sadwick | ............ | H05B 33/0818 315/287 |
| 2011/0130889 A1 * | 6/2011 | Khajehoddin | .......... | H02J 3/383 700/298 |
| 2011/0163695 A1 | 7/2011 | Schmid et al. | | |
| 2011/0187198 A1 * | 8/2011 | Williams | ................... | H02J 1/12 307/71 |
| 2011/0279101 A1 * | 11/2011 | Sasaki | ..................... | H02M 1/32 323/271 |
| 2012/0299480 A1 * | 11/2012 | Peting | ................ | H05B 37/0263 315/113 |

OTHER PUBLICATIONS

Tahim, Andre P.N. et al, "Control of Interconnected Power Electronic Converters in DC Distribution Systems", Department of Automation and Systems, Fed. Univ. of Santa Catarina, Florianopolis, Brazil. pp. 1-6.

* cited by examiner

ELECTRICAL DEVICE AND POWER GRID SYSTEM FOR PROVIDING A DEVICE OUTPUT DEPENDING ON AN ELECTRICAL INPUT

FIELD OF THE INVENTION

The invention relates to an electrical device, which provides an output depending on an electrical input, and to a power grid system and a method for providing a direct current (DC) voltage as an electrical input to an electrical device. The invention relates further to an electrical circuit comprising an electrical device and a power grid system to which the electrical device is connected, and a method and a computer program for providing an output of an electrical device depending on an electrical input.

BACKGROUND OF THE INVENTION

A proprietary DC power grid system can be used for supplying electrical devices like lamps of a building with DC voltage. The DC voltage provided by the DC power grid system can fluctuate, wherein the electrical device is configured such that the output of the electrical device is constant, if this fluctuation of the supplied DC voltage occurs. For example, a lamp can be configured such that the intensity of the light generated by the lamp is constant, even if the supplied DC voltage fluctuates. If the output of the electrical device should be modified, the electrical device needs a corresponding control construction, which controls the output of the electrical device independently of the supplied DC voltage. For instance, in order to provide a dimming function for dimming a lamp, an additional control construction is needed, which allows a person to modify the intensity of the light generated by the lamp independently of the supplied DC voltage. This additional control construction can be technically relatively complex and may be relatively spacious.

SUMMARY OF THE INVENTION

It is an object of the present invention to provide an electrical device for providing an output depending on an electrical input, wherein a control of the output of the electrical device can be simplified.

In a first aspect of the present invention an electrical device for providing an output depending on an electrical input is presented, wherein the electrical device is adapted to provide a constant output, if the electrical input is in a first electrical input range, and a dependent output, if the electrical input is in a second electrical input range, wherein the dependent output depends on the electrical input.

Since the electrical device is adapted to provide a constant output, if the electrical input is in a first electrical input range, the output remains constant, even if the electrical input fluctuates within the first electrical input range. For instance, if the electrical device is connected to a DC power grid system for receiving DC voltage as an electrical input and if the nominal DC voltage of the DC power grid system is within the first electrical input range, the output of the electrical device remains constant, even if the DC voltage supplied by the DC power grid system fluctuates within the first electrical input range. Moreover, since, if the electrical input is in a second electrical input range, the dependent output depends on the electrical input, the output can be controlled by just using the electrical input, thereby allowing a very simple control of the output of the electrical device.

Thus, the electrical device can be adapted to fulfill two functions. In order to provide a constant output despite of possible fluctuations of the electrical input, the output is constant within the first electrical input range, and in order to allow the output to be controlled by the electrical input, in the second electrical input range the output depends on the electrical input.

The electrical device is preferentially an electrical load, and the electrical input is preferentially an input voltage. It is further preferred that the electrical device is adapted for being connected to a DC power grid system for receiving the electrical input from the DC power grid system, wherein the DC power grid system is provided with a modifying unit for modifying the electrical input to the electrical device. In particular, the modifying unit is adapted to modify the electrical input within the second electrical input range. This allows modifying the output of the electrical device by just modifying the DC voltage provided by the DC power grid system. The modifying unit can be arranged, for example, between a distribution cable of the DC power grid system and one or several electrical devices, or the modifying unit can also be part of a rectifying system of the DC power grid system, wherein the rectifying system rectifies alternating current (AC) to direct current and the modifying unit modifies the corresponding DC voltage, before being provided to a DC distribution system, which comprises, for instance, cables for distributing the modified DC voltage to one or several electrical devices of, for instance, a building.

The DC power grid system is preferentially a proprietary grid system of, for example, a building, in which the electrical device is located.

The modifying unit is preferentially adapted for continuously modifying the input voltage, which may be regarded as being a supply voltage, to the electrical device.

The electrical device is preferentially a lamp. The electrical device can also be another electrical load like a fan, a sensor, a motor, a variable speed driver et cetera.

If the electrical device is a lamp connected to a DC power grid system providing the input voltage, i.e. the supply voltage, the lamp can be dimmed, if the input voltage is within the second electrical input range, by modifying the input voltage provided by the DC power grid system, whereas the output of the lamp is not affected by fluctuations of the power grid, if the input voltage is within the first electrical input range.

If the electrical device is a lamp, a modification of the output caused by modifying the electrical input may be a modification of a property of light emitted by the lamp. For instance, the light intensity, the light direction, the light color, the beam width, et cetera, can be controlled, without needing a separate control channel, just by modifying the voltage supplied by the DC power grid system. If the electrical device is another load, the corresponding property, which may be modified, will generally also be another one. For instance, if the electrical device is a fan, the fan direction, the intensity of the air flow and/or the temperature may be modified depending on the electrical input, or, if the electrical device is a motor, the motor speed may be modified depending on the electrical input.

It is also preferred that the first electrical input range comprises electrical input values being larger than all electrical input values within the second electrical input range. In particular, the first electrical input range and the second electrical input range are adjacent to each other. For example, the first electrical input range can range from 360 to 400 V and the second electrical input range can range from 0 to 360 V. Moreover, the second electrical input range has a lower boundary, wherein the electrical device can be adapted to provide a zero output, if the electrical input is smaller than the lower boundary of the second electrical input range. For instance, the lower boundary can be larger than a residual power grid voltage of, for example, 12 V. The lower boundary can also have a larger value. In an embodiment, the lower boundary is 320 V, wherein the second electrical input range ranges from 320 to 360 V and the first electrical input range ranges from 360 to 400 V.

It is further preferred that the electrical device is adapted such that in the second electrical input range the dependence of the output on the electrical input forms a step function. Small fluctuations of the electrical input, in particular, small voltage fluctuations, within one step do therefore not change the output of the electrical device. Preferentially, to allow a smooth transition from one step to another this transition is preferentially linear. This can reduce a possible visibility of changes from one step to another step. In another embodiment, the dependence of the output on the electrical input in the second electrical input range can also have another form. For instance, in the second electrical input range the dependence of the output on the electrical input can form a hysteresis function or a linear function.

In an embodiment, the electrical device is adapted to provide the dependent output in the second electrical input range depending on predefined assignments between the electrical input and outputs of the electrical device. For example, if the electrical device is a lamp, different electrical inputs within the second electrical input range can be assigned to different colors of the lamp such that the lamp can be switched between different colors depending on the electrical input, in particular, depending on the supplied DC voltage. Preferentially, after the electrical input has left the second electrical input range and is within the first electrical input range, the last output, which had been chosen, before leaving the second electrical input range, is output by the electrical device.

It is further preferred that the electrical device is adapted such that the output is modifiable by modifying the electrical input, only if the electrical input has been in the second electrical input range for a predefined time. This can reduce the effect of flickering of the electrical input.

In a further aspect of the present invention a power grid system for providing a DC voltage as an electrical input to an electrical device is presented, wherein the power grid system comprises a modifying unit for modifying the provided DC voltage.

The modifying unit of the power grid system can be, for example, a part of a rectifying unit, which rectifies alternating current to direct current, wherein the corresponding DC voltage is modified, before supplying it to a distribution system, which may comprise distribution cables for distributing the modified DC voltage to one or several electrical devices. The modifying unit can also be part of the distribution system and/or it can be connected between a distribution cable and one or several electrical devices. The modifying unit allows modifying the output of the electrical device in a relatively simple way, without requiring an electrical device having a switch or the like for modifying the output.

The modifying unit can be adapted to receive an electrical input setting signal being indicative of an electrical input value to be set, wherein the modifying unit can be adapted to modify the provided DC voltage depending on the received electrical input setting signal. This can allow remotely controlling the DC voltage supplied by the power grid system and, thus, remotely controlling the electrical devices connected to the power grid system.

In a further aspect of the present invention an electrical circuit is presented, wherein the electrical circuit comprises an electrical device, a power grid system for providing an electrical input to the electrical device, and a modifying unit for modifying the electrical input. The electrical circuit can comprise one or several electrical devices. For example, a group of lamps can be connected to a common modifying unit for commonly modifying the voltage supplied to the lamps by the power grid.

Preferentially, the power grid system comprises a nominal voltage, wherein the first electrical input range contains the nominal voltage. Moreover, in an embodiment the power grid system comprises a nominal voltage, wherein a lower boarder of the second electrical input range is at least twenty percent smaller than the nominal voltage and wherein an upper boarder of the second electrical input range is at least ten percent smaller than the nominal voltage.

In a further aspect of the present invention a method for providing an output of an electrical device depending on an electrical input is presented, wherein a constant output is provided, if the electrical input is in a first electrical input range, and a dependent output is provided, if the electrical input is in a second electrical input range, wherein the dependent output depends on the electrical input.

It is further aspect of the present invention a method for providing a DC voltage of a power grid system as an electrical input to an electrical device is presented, wherein the provided DC voltage is modified by a modifying unit of the power grid system.

In a further aspect of the present invention a computer program for providing an output of an electrical device depending on an electrical input is presented, wherein the computer program comprises program code means for causing an electrical device as defined in claim 1 to carry out the steps of the method as defined in claim 13, when the computer program is run on a computer controlling the electrical device.

It shall be understood that the electrical device of claim 1, the power grid system of claim 9, the electrical circuit of claim 11, the methods of claims 13 and 14 and the computer program of claim 15 have similar and/or identical preferred embodiments as defined in the dependent claims.

It shall be understood that a preferred embodiment of the invention can also be any combination of the dependent claims with the respective independent claim.

DETAILED DESCRIPTION OF EMBODIMENTS

Figure 1:
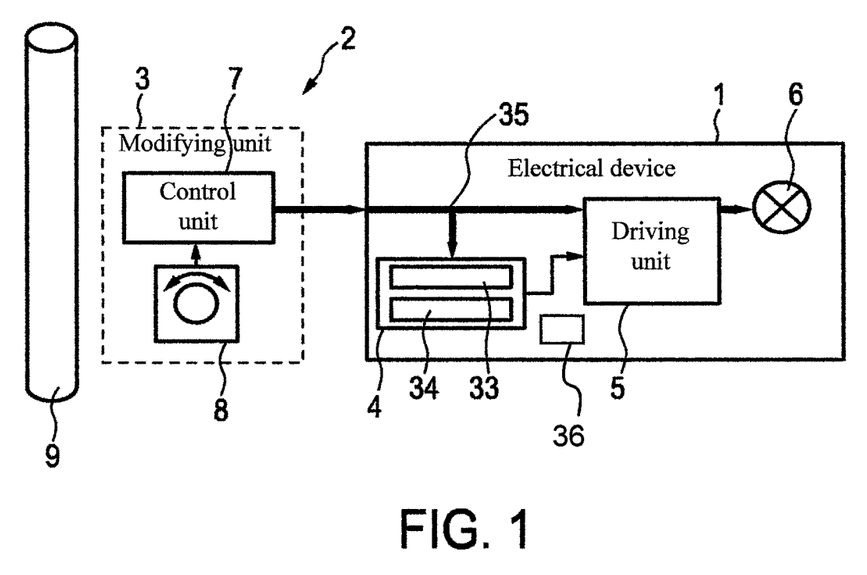
FIG. 1 shows schematically and exemplarily an embodiment of an electrical device and a power grid system.

FIG. 1 shows schematically and exemplarily an electrical device 1 connected to a DC power grid system 2. The electrical device 1 is adapted to provide a constant output, if an electrical input is in a first electrical input range, and a dependent output, if the electrical input is in a second electrical input range, wherein the dependent output depends on the electrical input. In this embodiment, the electrical device 1 is a lamp and the output of the lamp is the light emitted by the lamp. For example, the light intensity or the light color can be modified depending on the electrical input, which is, in this embodiment, a DC voltage supplied to the electrical device 1.

The electrical device 1 comprises an electrical input detection unit 4, which detects the value of the DC voltage 35 supplied to the electrical device 1 and which generates a control signal, which is transmitted to a driving unit 5 for driving a light generating unit 6. The control signal is indicative of the DC voltage, which should be applied to the light generating unit 6 by the driving unit 5. In particular, in this embodiment the electrical input detection unit 4 comprises a measuring unit 33 for measuring the supplied DC voltage 35 and a control signal determination unit 34, which comprises, for example, a microprocessor and which determines the control signal and, thus, the DC voltage to be applied to the light generating unit 6 depending on the measured DC voltage 35 supplied by the DC power grid system 2. Thus, the control signal determination unit 34 is, in this embodiment, adapted to provide a control signal indicating a constant DC power applied to the light generating unit 6 by the driving unit 5, if the measured DC voltage supplied by the DC power grid system 2 is within the first DC voltage range, and to provide a control signal indicating a dependent DC voltage, which is to be applied to the light generating unit 6 by the driving unit 5, if the measured DC voltage received from the DC power grid system 2 is within the second DC voltage range, wherein the dependent DC voltage applied to the light generating unit 6 depends on the measured DC voltage supplied by the DC power grid system 2.

The DC power grid system 2 is provided with a modifying unit 3 for modifying the DC voltage supplied to the electrical device 1. The DC power grid system is, for example, a proprietary grid system of a building, in which the electrical device 1, in particular, the lamp, is located. The modifying unit 3 can be adapted for continuously modifying the DC voltage supplied to the electrical device 1. In this embodiment, the lamp 1 can be dimmed, if the input voltage, i.e. the DC voltage supplied by the DC power grid system 2, is within the second DC voltage range, by modifying the input DC voltage by using the modifying unit 3. Thus, the light intensity of the lamp 1 can be modified by modifying the DC voltage supplied by the DC power grid system 2.

In this embodiment, the modification unit 3 comprises a control unit 7, which is adapted to control the DC voltage received from a distribution cable 9 of the DC power grid system 2. In particular, the control unit 7 is adapted to modify the received DC voltage in accordance with a control signal provided by a user interface 8. The user interface 8 allows a user to modify the DC power supplied to the electrical device 1 as desired. The output of the electrical device 1 can therefore be controlled by just modifying the voltage supplied by the DC power grid system 2, without needing an electrical device having a separate control channel.

The first electrical input range, i.e. in this embodiment, the first DC voltage range, comprises voltage values being larger than all voltage values within the second electrical input range, i.e. in this embodiment, the second DC voltage range. The first electrical input range and the second electrical input range can be adjacent to each other, wherein, for instance, the first electrical input range can range from 360 to 400 V and the second electrical input range can range from 0 to 360 V.

Figure 2:
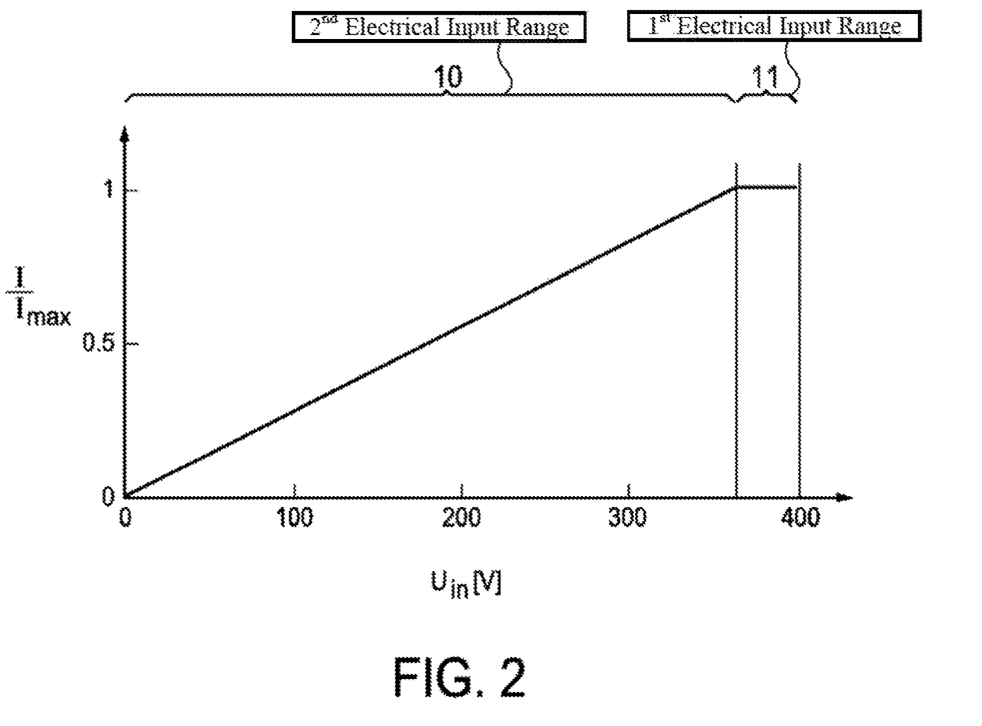
FIGS. 2 to 5 show different dependencies of an output of the electrical device on an electrical input to the electrical device.

FIG. 2 illustrates exemplarily corresponding first and second electrical input ranges. FIG. 2 shows a normalized intensity of the light emitted by the lamp 1 depending on the DC voltage $U_{in}$ supplied by the DC power grid system 2 to the lamp 1. In the second electrical input range 10 the intensity of the emitted light increases linearly with the DC voltage $U_{in}$ supplied by the DC power grid system 2. In the first electrical input range 11 the lamp 1 emits light having a constant maximum intensity $I_{max}$.

Figure 3:
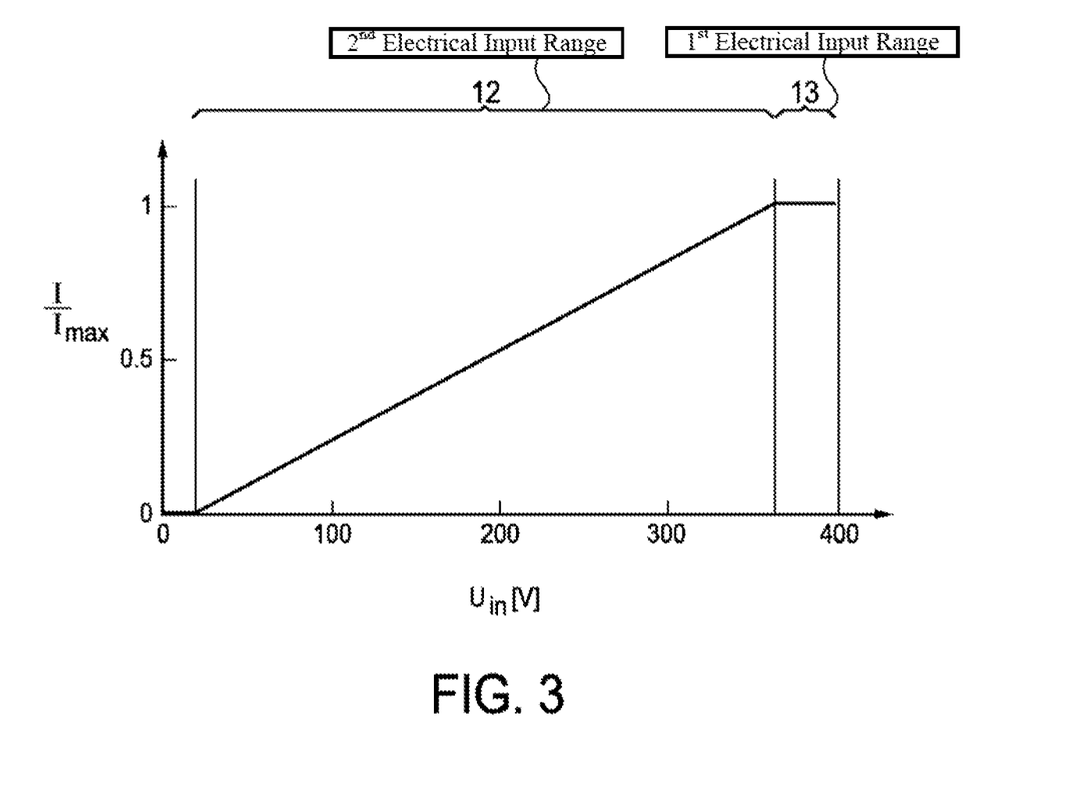

In another embodiment, the electrical device 1 can be adapted to provide a zero output, if the electrical input is smaller than the lower boundary of the second electrical input range. For instance, the lower boundary of the second electrical input range can be larger than a residual power grid system voltage of, for instance, 12 V. Corresponding first and second electrical input ranges are exemplarily illustrated in FIG. 3. In FIG. 3, in the second electrical input range 12 the intensity of the light emitted by the lamp 1 increases linearly with increasing DC voltage $U_{in}$ supplied by the DC power grid system 2 and in the first electrical input range 13 the intensity of the light emitted by the lamp 1 is the maximum intensity $I_{max}$. The second electrical input range 12 has a lower boarder being larger than zero, in particular being 12 V, in this embodiment. This allows supplying a small voltage of, for example, 12 V, to the control signal determination unit 34, in particular, to a microcontroller of the control signal determination unit 34, without generating light. However, in other embodiments the lower boundary of the second electrical input range can also have a larger value. For example, the lower boundary can be 320 V, wherein the second electrical input range ranges from 320 to 360 V and the first electrical input range ranges from 360 to 400 V.

In a further embodiment, the electrical device 1 can be adapted such that in the second electrical input range the dependence of the output on the electrical input forms a step function, wherein the transition from one step to another is preferentially linear. Such a step function is schematically and exemplarily shown in FIG. 4.

Figure 4:
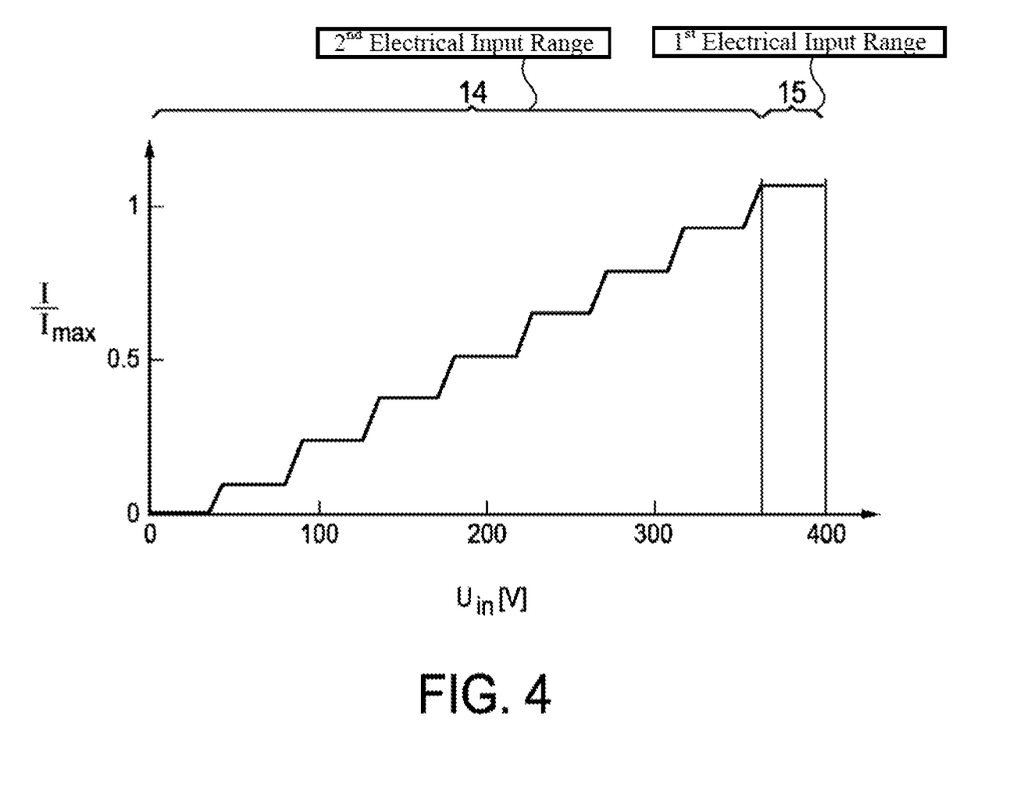

In FIG. 4, in the second electrical input range 14 the dependence of the intensity of the light emitted by the lamp 1 depends in a step-like manner on the DC voltage $U_{in}$ supplied by the DC power grid system 2. The first electrical input range 15, in which the lamp 1 emits light having the maximum intensity $I_{max}$ independently of the DC voltage supplied by the DC power grid system 2, is denoted by reference number 15. The step function has the advantage that small voltage fluctuations within one step do not change the intensity of the light. The corresponding control signal, which is generated by the control signal determination unit 34, can be low-pass filtered, in order to distribute a corresponding change in the output of the electrical device, in this embodiment, change in the intensity of the light generated by the light generating unit 6, over a larger time. This low-pass filtering leads to a reduced visibility of relatively large light intensity changes, which may be present, if the DC voltage changes only a little, within voltage ranges defined by the substantially vertical parts of the step-like function shown in FIG. 4.

In a further embodiment, the electrical device 1 is adapted such that in the second electrical input range the dependence of the output, i.e. of the intensity of the light emitted by the lamp 1, on the DC voltage supplied by the DC power grid system 2 forms a hysteresis function. Such a hysteresis function in a second electrical input range 16 is schematically and exemplarily shown in FIG. 5. This hysteresis function will in the following be described by an exemplary function circle.

Figure 5:
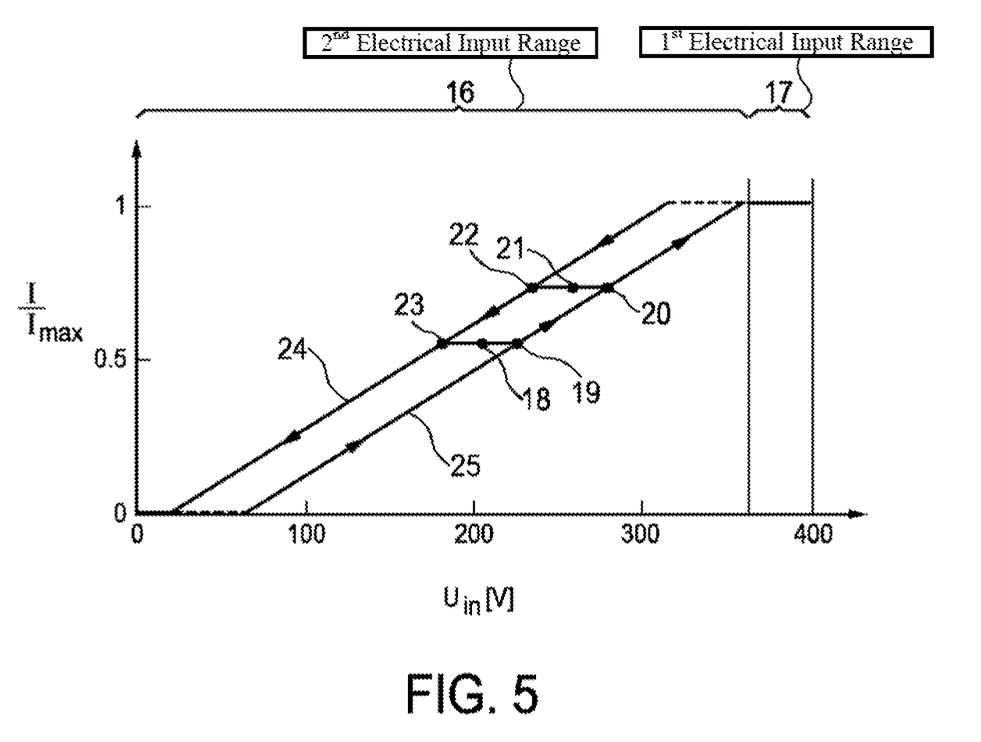

It is assumed that in the beginning of the exemplary function circle the lamp 1 operates in a certain operation point 18 and that, if the DC voltage supplied by the DC power grid system 2 increases, firstly the intensity of the light remains constant. If a certain predefined threshold voltage is exceeded, the intensity of the light, i.e. the voltage or power applied to the light generating unit 6 by the driving unit 5, increases. This certain predefined threshold voltage is reached at point 19. Starting at point 20 the DC voltage supplied by the DC power grid system 2 is no longer increased but reduced, firstly to a voltage which corresponds to point 21. Although the supplied DC grid voltage has been reduced, the intensity of the light has not been decreased, but has been kept constant. The lamp 1 is now operated around the point 21 for a while. Small voltage fluctuations will not change the light intensity. In order to reduce the light intensity, i.e. the power or voltage applied to the light generating unit 6 by the driving unit 5, the DC grid voltage has to fall below the voltage at the point 22. If the DC grid voltage is further reduced, the intensity can reach, for example, the intensity of the light at point 23. If at this point 23 the DC grid voltage is again increased, the starting point 18 can be reached. This characteristic is well suited for dimming purposes.

The hysteresis function can be defined by two parallel lines 24, 25, wherein a first line 25 defines the dependence of the light intensity, if the operation point is on the first line 25 and the DC grid voltage is increased, and a second line 24 defines the dependence of the light intensity, if the operation point is on the second line 24 and the DC grid voltage is decreased. If the operation point is on the first line 25 and the DC grid voltage is decreased, the light intensity firstly remains constant, i.e. the operation point moves along a line being parallel to the DC grid voltage axis, until the operation point has reach the second line 24. If the operation point is on the second line 24 and the DC grid voltage is increased, the light intensity remains constant, until the operation point has reached the first line 25.

In other embodiments, the output of the electrical device can also depend in another way on the electrical input. In particular, the electrical device can be adapted to provide the dependent output in the second electrical input range depending on predefined assignments between the electrical input and the output of the electrical device. For example, the electrical device can be a lamp, wherein the assignments can define relations between the DC grid power and colors of the light emitted by the lamp.

The electrical device 1 can be further adapted such that the output is only modified, if the electrical input has been in the second electrical input range for a predefined time. The electrical device can comprise, for example, a timing unit for measuring the time the DC grid voltage was in the second electrical input range, wherein the output of the electrical device is modified only, if this measured time is larger than a predefined time threshold. This can reduce a possible effect of flickering of the DC grid voltage on the output of the electrical device. Such flicker can occur, if, for example, short spikes are on the distribution cable 9, for instance, when a capacitive load gets connected.

Figure 6:
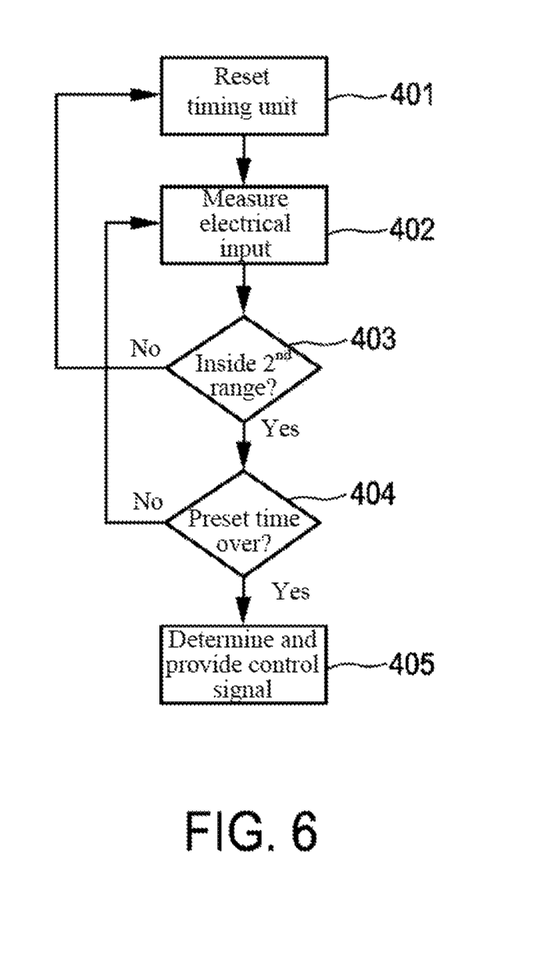
FIG. 6 shows a flowchart exemplarily illustrating a timing procedure.

FIG. 6 shows a flowchart exemplarily illustrating a possible interaction between a measuring unit and microcontroller of a control signal determination unit for providing a control signal to a driving unit of, for example, a light generating unit such that the output of the electrical device is modified only, of the electrical input has been in the second electrical input range for a predefined time.

In step 401, a timing unit of the control signal determination unit is reset. In step 402, the measuring unit measures the electrical input, in particular, the DC grid voltage, and, in step 403, the control signal determination unit determines whether the electrical input is inside the second electrical input range or not. If the measured electrical input is not within the second electrical input range, it is proceeded with step 401. If the measured electrical input is within the second electrical input range, in the next step 404 it is determined whether a preset time as indicated by the timing unit is over or not. If the time is not over, this timing procedure continuous with step 402. If the time is over, a control signal is determined in accordance with the measured electrical input and the determined control signal is provided to the driving unit of, for example, the light generating unit in step 405.

In an embodiment it is further determined, whether a possible change of the measured electrical input is smaller than a predefined threshold, while the loop defined by steps 402 to 404 is performed. This change can be measured as the percentage of modification of the measured electrical input divided by the time in which this percentage has been occurred. If this change is larger than the predefined threshold, the timing unit can be reset again and the procedure can start again with step 401. This allows filtering noise and small disturbances in the second electrical input range.

Figure 7:
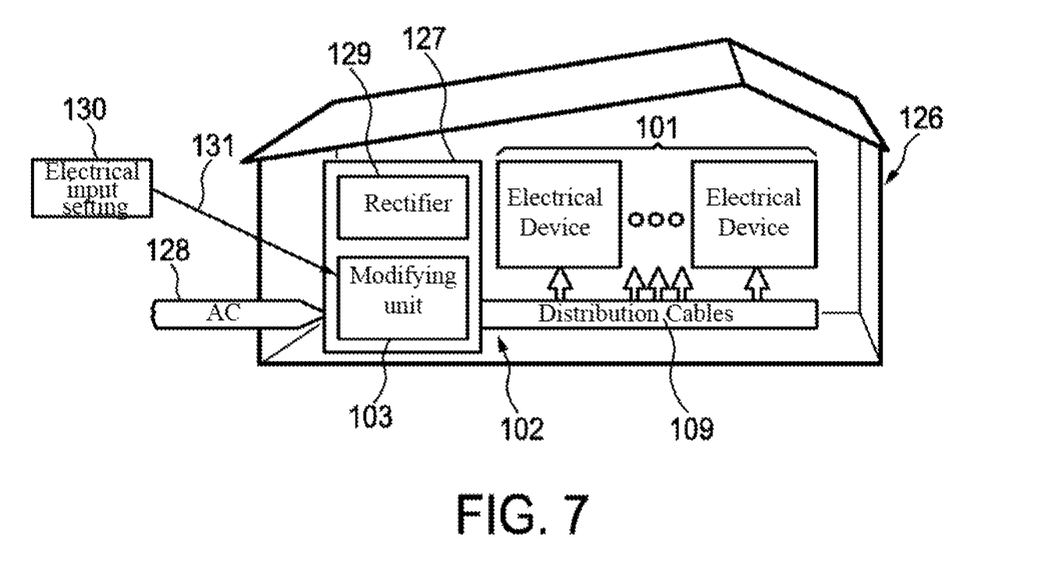
FIG. 7 shows schematically and exemplarily a further embodiment of a power grid system supplying DC voltage to several electrical devices.

FIG. 7 shows schematically and exemplarily a further embodiment of a DC power grid system. The DC power grid system 102 supplies DC grid voltage to several electrical devices 101. The DC power grid system 102 comprises a rectifying unit 127 with a rectifier 129 for rectifying alternating current 128 to direct current. The DC power grid system 102 is a proprietary grid system of a building 126, wherein alternating current 128 of an external grid is rectified to DC voltage by the rectifier 129. The rectifying unit 127 further comprises a modifying unit 103 for modifying the rectified DC voltage. The modified DC voltage is the DC grid voltage, which is supplied to the electrical devices 101 via a distribution system comprising distribution cables 109. The modifying unit 103 can comprise a user interface for allowing a user to modify the DC grid voltage. In the embodiment shown in FIG. 7, an electrical input setting unit 130 is provided, which is connected with the modifying unit 103 via a data connection 131 for allowing a user to set the DC grid voltage. The electrical input setting unit 130 can be an external unit, which is located remote from the building 126, or it can be an internal unit, which is located within the building 126. In an embodiment, the electrical input setting unit 130 is connected with the modifying unit 103 via the Internet such that the DC grid voltage can be modified via the Internet.

The above described DC power grid systems 2, 102 comprise preferentially a nominal voltage of, for example, 380 V. The first electrical input range contains preferentially the nominal voltage of the respective DC power grid system.

It is further preferred that the lower boarder of the second electrical input range is at least twenty percent smaller than the nominal voltage, wherein an upper boarder of the second electrical input range is preferentially at least ten percent smaller than the nominal voltage.

Figure 8:
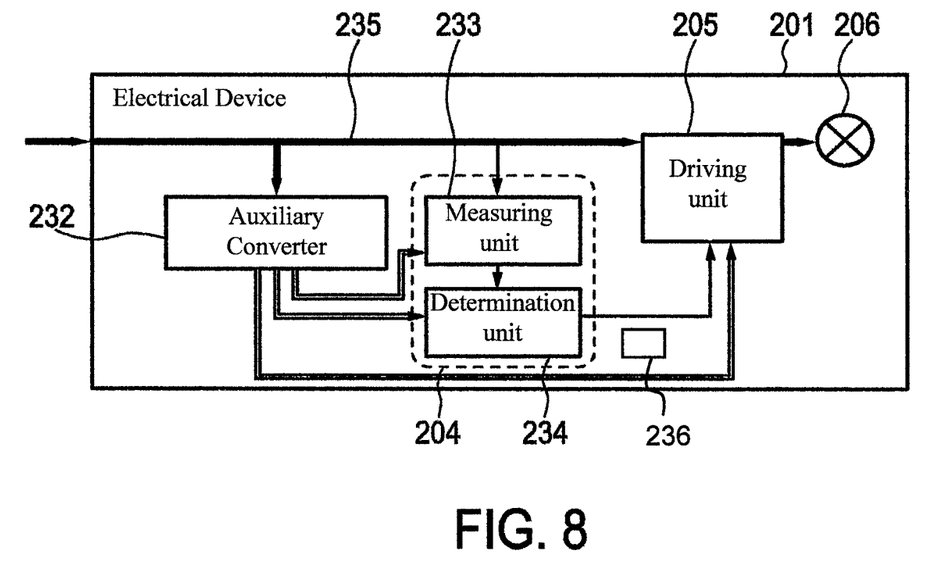
FIG. 8 shows schematically and exemplarily a further embodiment of an electrical device.

FIG. 8 shows schematically and exemplarily a further embodiment of an electrical device. Also the electrical device 201 shown in FIG. 7 is a lamp comprising an electrical input detection unit 204 with a measuring unit 233 and a control signal determination unit 234. The measuring unit 233 measures the DC grid voltage 235 received from a DC power grid system, which is not shown in FIG. 8. The control signal determination unit 234 determines a control signal depending on the measured DC grid voltage. The control signal is indicative of the voltage to be applied to the light generating unit 206 via the driving unit 205. The measuring unit 233 comprises preferentially an analog-to-digital converter for providing a digital DC grid voltage value to the control signal determination unit 234. The control signal determination unit 234 comprises preferentially a microcontroller which is configured to determine the control signal. The control signal determination unit 234 is adapted such that the determined control signal leads to a constant output of the electrical device 201, if the DC grid voltage is in a first electrical input range, and a dependent output, if the DC grid voltage is an a second electrical input range, wherein the dependent output depends on the DC grid voltage.

The electrical device 201 further comprises an auxiliary converter 232 for converting the DC grid voltage 235 to another DC voltage being suitable for driving the measuring unit 233, the control signal determination unit 234 and the driving unit 205.

As already mentioned above, the lower boarder of the second electrical input range, in particular, of the second voltage range, can be relatively high. If this is the case, the auxiliary converter 232 within the electrical device does not need to generate auxiliary power or an excessive input voltage range. In addition, it may then be possible to run lamps or other electrical devices like ventilation fans or sensors on the same distribution of the DC grid power, wherein at least some of these lamps or other electrical devices are not controlled by the DC grid voltage, if their respective driving units are able to work within a voltage range being below the lower boarder of the second voltage range.

Figure 9:
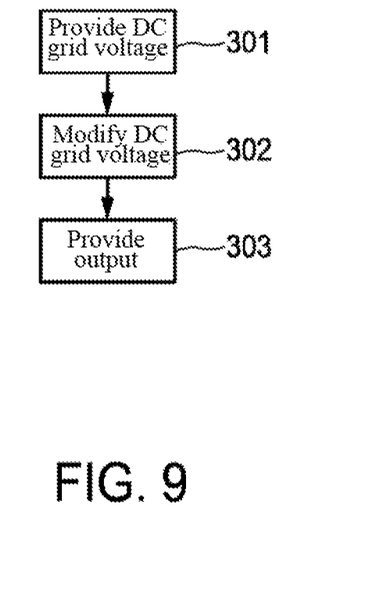
FIG. 9 shows a flowchart exemplarily illustrating an embodiment of a method for providing an output of an electrical device depending on an electrical input and for providing a DC voltage of a power grid system as the electrical input.

In the following embodiment a method for providing a DC voltage of a power grid system as an electrical input to an electrical device and for providing an output of the electrical device depending on the electrical input will be described with reference to a flowchart shown in FIG. 9.

In step 301, a DC power grid system provides a DC grid voltage. In step 302, this DC grid voltage is modified by using, for example, the modifying units 3 and 103 of the DC power grid system, which are described above with reference to FIGS. 1 and 7. In step 303, the electrical device provides an output in accordance with the modified DC grid voltage. In particular, the electrical device provides a constant output, if the modified DC grid voltage is within the first electrical input range, and a dependent output, which depends on the modified DC grid voltage, if the modified DC grid voltage is within the second electrical input range.

In an embodiment, the modifying unit for modifying the DC grid voltage of the DC power grid system is a central controller of the DC power grid system for centrally modifying the DC grid voltage. Sub-grids can be defined, wherein a group of electrical devices can be connected to a common modifying unit of the DC power grid system. In particular, an electrical circuit can comprise the DC power grid system and several electrical devices, wherein the electrical devices can be connected to the same modifying unit or to different modifying units of the DC power grid system.

The lamp described above with reference to FIG. 1 allows to keep the light intensity of the lamp constant, if the DC grid voltage of the DC power grid system fluctuates. On the other hand, the light intensity can be controlled by varying the supplied DC grid voltage. Thus, for example, the lamp can be dimmed, without needing a lamp having an additional dimming control channel.

The above mentioned electrical input setting unit, which can be a remote unit outside of, for example, a building comprising the DC power grid system, or which can be an internal unit within the building, can be used for improving the power management of the DC power grid system. For instance, a voltage decrease usually indicates an increased load in the DC power grid system. If the loads in the grid have a constant power characteristic, the load currents will increase, and the DC power grid system may become unstable and crash. If, for example, a central power converter of a DC power grid system has the possibility to reduce its load power with a reduced voltage, because it comprises, for instance, the modifying units 3 and 103 described above with reference to FIGS. 1 and 7, the DC power grid system can be kept stable without going in brownout. Therefore, the modifying unit, which can modify the DC grid voltage, in particular, via a remote electrical input setting unit, allows the function of a local smart grid without additional communication channel.

The first voltage range, i.e. the first electrical input range, is preferentially defined such that it includes the nominal rated voltage range of the DC power grid system. It is preferentially defined with a nominal DC voltage and a possible deviation from this voltage of a few percent. For instance, the first voltage range can be defined by the nominal voltage of the DC power grid and a deviation of ten percent ($U_{nom} \pm 10\%$). Preferentially, the second voltage range, i.e. is the second electrical input range, is a range with lower voltages than the first voltage range, which connects to it. In the second voltage range, the power characteristic of the lamp is preferably at least monotonically rising, which means, a higher supply voltage, i.e. a higher DC grid voltage, leads to a higher lamp power, i.e. a higher power provided by the driving unit to the light generating unit. Even more preferably, this characteristic is linear.

Although in the above described embodiments the electrical device is preferentially a lamp, the electrical device can also be another electrical load like a fan, a sensor, a motor, et cetera.

Although in the above described embodiments a modification of the output caused by modifying the electrical input is a modification of the light intensity, in other embodiments also other properties of the light can be modified. For instance, the light direction, the light color, et cetera, can be modified and controlled depending on the electrical input. If the electrical device is another load, the corresponding property, which may be modified, will generally also be another one. For instance, if the electrical device is a fan, the fan direction and/or the ventilation intensity, in particular, the rotational speed of the fan, may be modified depending on the electrical input.

Although in the above described embodiments the power grid system is a DC power grid system, the power grid system can also be another kind of power grid system. For example, it can be an AC power grid system, which can make use of the invention, in order to reduce audible noise or high frequency content in the cables. For instance, a humming of a power transformer and/or noise caused by magnetic components like magnetic components in driving units for driving a light source can be reduced by reducing the amplitude of an AC voltage supplied by a AC power grid system. The high frequency content in the cables, i.e. unwanted disturbing radio frequency emissions, which may be generated in power supply switches, can also be reduced by reducing the amplitude of the supplied AC grid voltage.

If an electrical circuit comprises the DC power grid system with the modifiable DC grid voltage and several electrical devices connected to the DC power grid system, it is not necessary that all electrical devices have implemented the concept of a constant output in a first voltage range and a dependent output in a second voltage range. Some electrical devices can just be adapted to, for example, switch themselves off, if the modified DC grid voltage is outside of the DC voltage required by the respective electrical devices.

Although in above described embodiments the modification unit comprises a user interface for allowing a user to modify the DC voltage supplied to an electrical device, in other embodiments the modification unit can also be adapted to modify the DC voltage supplied to the electrical device based on, for example, events or states detected by a sensor, i.e., for instance, the modification unit can comprise assignments between certain events or states, which can be detected by a sensor, and the DC voltage supplied to the electrical device. For example, the DC voltage can be modified depending on an ambient light intensity detected by a light sensor or depending on motion detected by a motion sensor, wherein, for instance, the DC voltage can be decreased, if a movement is not detected anymore. Moreover, the modification unit can also be adapted to modify the DC voltage supplied to the electrical device depending on a predefined time schedule.

Although in the above described embodiments the electrical devices comprise only a single unit which provides an output, in other embodiments an electrical device can also comprise more than one unit which provides an output. For instance, the electrical device can be a lamp, which does not only comprise a light generating unit, but also a fan. The electrical device includes then, for instance, in a storage unit 36, 236, assignments between different outputs of the light generating unit and the fan on the one side and the electrical input, in particular, the DC grid voltage, on the other side. In an embodiment, several voltage regions within the second electrical input range can be defined, wherein these several voltage regions can be assigned to different colors of the light of the light generating unit or to different rotational speeds of the fan. For example, three different voltage ranges can be assigned to three different rotational speeds, and two other different voltage ranges can be assigned to two different colors of the light. If the electrical input leaves the second electrical input range, the output of the electrical device preferentially remains constantly the output, which has been chosen at last, before leaving the second electrical input range.

The output of the electrical device can also depend on the time a certain voltage is supplied to the electrical device. For instance, a certain length of time and a certain DC voltage can be assigned to a certain output of the electrical device. A voltage and optionally also a length of time of supplying the voltage to the electrical device can not only be assigned to a single output value like a single output intensity or output color, but also to a sequence of output values. For instance, a certain grid voltage and optionally a certain length of time can be assigned to a sequence of colors of light generated by a light generating unit. It can also be defined that a certain voltage is assigned to a certain sequence, wherein each time the grid voltage reaches this certain voltage, the output of the electrical device is modified in accordance with a next element of the sequence, or, it can be defined that the output is modified in accordance with a predefined sequence of output characteristics like a predefined sequence of colors with a constant velocity, while a certain voltage is supplied to the electrical device. For instance, the electrical device can be a Gobo projector for projecting different light patterns, which may be static or moving light patterns. The respective light pattern may be selected by supplying a corresponding voltage to the Gobo projector. For example, the Gobo projector can be adapted such that, if a first DC voltage of, for instance, 250 V±5% is supplied to the Gobo projector, a first light pattern can be projected, wherein, each time a second DC voltage of, for instance, 280 V±5% is reached, a next light pattern in a predefined sequence of light patterns is projected. The Gobo projector can further be adapted to provide a dimming region, for instance, within a voltage range of 320 to 360 V, wherein by supplying corresponding DC voltages to the Gobo projector, firstly a desired light pattern, i.e. a desired Gobo, can be selected and then a desired light intensity can be set.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Determinations like the determination of the control signal, which is provided to a driving unit of, for instance, a light generating unit, and/or the control of the electrical device and the power grid system in accordance with the above mentioned methods can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates an electrical device for providing an output depending on an electrical input. The electrical device is adapted to provide a constant output, if the electrical input is in a first electrical input range, and a dependent output, if the electrical input is in a second electrical input range, wherein the dependent output depends on the electrical input. The output can therefore remain constant, even if the electrical input, which is preferentially a DC grid voltage, fluctuates within the first electrical input range. Moreover, in the second electrical input range the output can be controlled by just controlling the electrical input like the DC grid voltage, without necessarily requiring an additional control construction of the electrical device. A resistance against fluctuations of the electrical input and a controllability of the output can therefore be realized in a relatively simple way.

The invention claimed is:

1. An electrical device for providing a device output depending on an electrical input, the electrical device comprising:
a measuring circuit configured to measure the electrical input;
a processor adapted to configure the device output as a constant output that is independent of a value of the electrical input in a first electrical input range in response to determining that the electrical input is in the first electrical input range, and to configure the device output as a dependent output that is dependent on a value of the electrical input in a second electrical input range in response to determining that the electrical input is in the second electrical input range, wherein the second electrical input range is different from the first electrical input range, and wherein the electrical device is adapted such that the dependence of the device output on the value of the electrical input in the second electrical input range includes a step function or a hysteresis function and/or such that the device output is modifiable by modifying the electrical input only in response to the processor determining that a length of time at which the electrical input has been in the second electrical input range exceeds a threshold; and
a storage unit, wherein the dependence of the device output on the electrical input in the second electrical input range comprises outputting different effects at different, corresponding values in the second electrical input range, wherein the storage unit stores assignments between said different effects and said different, corresponding values in the second electrical input range, and wherein the electrical device is configured to output said different effects at the different, corresponding values in the second electrical input range by referencing said stored assignments.

2. The electrical device as defined in claim 1, wherein the electrical input is an input voltage.

3. The electrical device as defined in claim 1, wherein the electrical device is adapted for being connected to a direct current power grid system for receiving the electrical input from the DC power grid system, wherein the DC power grid system is provided with a modifying unit for modifying the electrical input to the electrical device.

4. The electrical device as defined in claim 1, wherein the first electrical input range comprises electrical input values being larger than all electrical input values within the second electrical input range.

5. An electrical circuit comprising:
an electrical device as defined in claim 1,
a power grid system for providing an electrical input to the electrical device, and
a modifying unit for modifying the electrical input.

6. The electrical circuit as defined in claim 5, wherein the power grid system comprises a nominal voltage and wherein the first electrical input range contains the nominal voltage.

7. The electrical device of claim 1, wherein the electrical device is a lighting device and the device output is light.

8. The electrical device of claim 1, wherein the electrical device is a fan, a sensor, a motor or a variable speed driver.

9. The electrical device as defined in claim 1, wherein the electrical device includes a lighting device and wherein the different effects are different colors of light.

10. A method for providing a device output of an electrical device depending on an electrical input comprising:
measuring the electrical input;
configuring the device output as a constant output that is independent of a value of the electrical input in a first electrical input range in response to determining that the electrical input is in the first electrical input range; and
configuring the device output as a dependent output that is dependent on a value of the electrical input in a second electrical input range in response to determining that the electrical input is in the second electrical input range, wherein the second electrical input range is different from the first electrical input range, and wherein the dependence of the device output on the value of the electrical input in the second electrical input range includes a step function or a hysteresis function and/or wherein the device output is modified by modifying the electrical input only in response to the processor determining that a length of time at which the electrical input has been in the second electrical input range exceeds a threshold,
wherein the dependence of the device output on the electrical input in the second electrical input range comprises outputting different effects at different, corresponding values in the second electrical input range and wherein the configuring the device output as the dependent output comprises referencing assignments, stored in a storage unit, between said different effects and said different, corresponding values in the second electrical input range.

11. The method of claim 10, wherein the electrical device is a lighting device and the device output is light.

12. The method of claim 10, wherein the electrical device is a fan, a sensor, a motor or a variable speed driver.

13. The method of claim 10, wherein the electrical device includes a lighting device and wherein the different effects are different colors of light.

14. An electrical device for providing a device output depending on an electrical input, the electrical device comprising:
a measuring circuit configured to measure the electrical input, wherein the electrical input is a power signal that powers at least a part of the electrical device;
a processor adapted to configure the device output as a constant output that is independent of a value of the electrical input in a first electrical input range in response to determining that the electrical input is in the first electrical input range, and to configure the device output as a dependent output that is dependent on a value of the electrical input in a second electrical input range in response to determining that the electrical input is in the second electrical input range, wherein the second electrical input range is different from the first electrical input range, wherein the device depletes at least a portion of the energy in the electrical input in both of the first and second ranges to convert the at least a portion of the energy into the device output, wherein the electrical device includes a lighting device and the dependence of the device output on the electrical input in the second electrical input range comprises outputting different colors of light at different, corresponding values in the second electrical input range; and
a storage unit, wherein the storage unit stores assignments between said different colors and said different, corresponding values in the second electrical input range, and wherein the electrical device is configured to output said different colors at the different, corresponding values in the second electrical input range by referencing said stored assignments.

15. The electrical device of claim 14, wherein the electrical device comprises a fan, a sensor, a motor or a variable speed driver.

\* \* \* \* \*